July 22, 1969    H. W. WENDT    3,456,272
TAP HAVING A FLEXIBLE SHANK PORTION
Filed Oct. 31, 1966
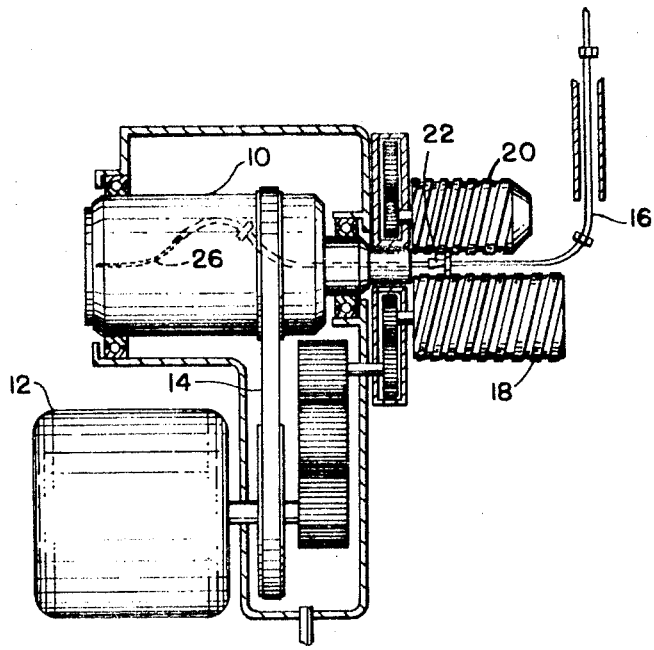
FIG.1
FIG.2
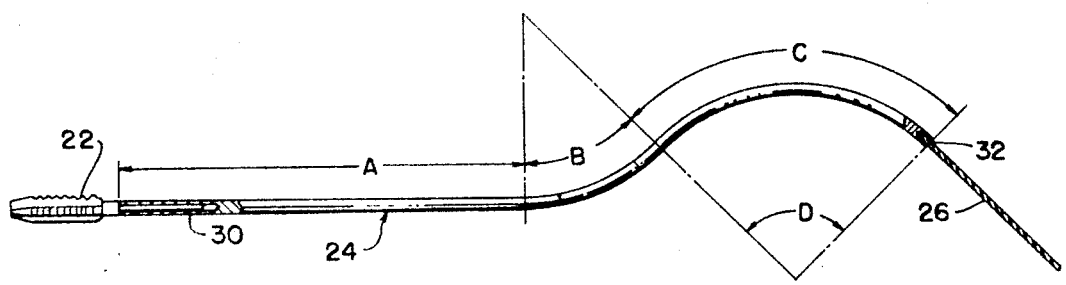
INVENTOR.
HARVEY W. WENDT
BY
*Whittemore, Hulbert & Belknap*
ATTORNEYS 3,456,272
TAP HAVING A FLEXIBLE SHANK PORTION
Harvey W. Wendt, Romeo, Mich., assignor, by mesne assignments, to National Twist Drill & Tool Co., Rochester, Mich., a corporation of Delaware
Filed Oct. 31, 1966, Ser. No. 590,852
Int. Cl. B23g 5/14
U.S. Cl. 10—141              9 Claims

ABSTRACT OF THE DISCLOSURE

A tap having a shank over which tapped nuts advance in a manner to support the tap, the shank having a laterally bent portion to provide for driving the shank in rotation, the end of the shank remote from the head having an elongated flexible tail having a diameter smaller than the minimum or root diameter of the thread of the tap.

---

It is an object of the present invention to provide a tap for a feed-through machine, said tap having a straight shank of reduced diameter onto which the tapped nuts advance after tapping, the shank being laterally bent and then reversely bent through substantial angles, and a flexible tail on the end of said shank.

Other objects and features of the invention will become apparent as the description proceeds, especially when taken in conjunction with the accompanying drawings, illustrating preferred embodiments of the invention, wherein:

FIGURE 1 is a diagrammatical view of a feed-through tapping machine.

FIGURE 2 is an enlarged elevational view of a bent tap shank constructed in accordance with the present invention.

Referring first to FIGURE 1 the machine comprises a shank housing 10 driven at high speed from a motor 12 through a drive belt indicated at 14. Nut blanks are advanced on a feed wire 16 to an assembly of rollers comprising two lower rollers 18 and an upper roller 20 which engage the nuts singly and advance them into tapping engagement with the head 22 of the tap, the tap including the bent shank 24 and the flexible tail 26.

Referring now to FIGURE 2 the shank indicated generally at 24 has secured thereto at one end a conventional tapping head 22, the shank being of sufficiently reduced diameter relative to the head as to permit tapped nuts to be advanced over the shank as is well understood.

The shank 24 includes a first straight portion A, and a second laterally bent portion B which is bent through an angle of about 45 degrees on a substantial radius, as for example between 2 and 3 inches. This is followed by the reversely bent portion C which extends through an arc D of between 30 and 90 degrees. Preferably, the straight portion A is all or nearly all of a constant diameter sufficient to provide clearance for free advance of tapped nuts thereover. The reversely bent portion C is all or nearly all of a slightly reduced diameter as compared to the diameter of the portion A. The intermediate curved portion B includes a portion of decreasing diameter from left to right interconnecting the relatively large diameter portion A and the relatively small diameter portion C. The tap is driven by the housing 10 through the agency of the tapped nuts on the shank within the housing.

At the free end of the straight portion A the head 22 has a reduced portion 30 which is received in the tubular end portion of the shank and brazed in place.

In accordance with the present invention the flexible tail 26 is secured to the end of the reversely bent portion C of the shank. This is conveniently accomplished by providing a recess 32 into which a reduced end portion of the flexible tail 26 is inserted and brazed.

The flexible cable is of the general type available in the open market under the designation "flexible aircraft cable." For example, one designation of flexible cable is 1/8" 7 x 19, which means that the cable proper is 1/8" in diameter, comprises 7 braided or twisted cables, each cable containing 19 wires or filaments. In practice, the cables which have been successfully employed in the operation vary between 5 inches and approximately 9 inches in length, and in general are a few thousandths of an inch smaller in diameter than the reversely curved portion C of the shank.

A typical example is a 1/4" tap associated with a shank portion A having a diameter of .185" and a reversely bent shank portion C having a diameter of .163", the flexible tail having a diameter of 3/32" and being between 4 and 10 inches in length.

A second embodiment of the invention is a 5/16" tap having the shank portion A of .238" diameter, the shank portion C of a .183" diameter, and the flexible tail having a diameter of 1/8" and a length between 4 and 10 inches.

A third embodiment of the invention comprises a tap having a nominal tap surface of 7/16", a shank portion A having a diameter of .339", a shank portion C having a diameter of .250", and the flexible tail or cable having a diameter of 3/16" and a length between 5 and 9 inches.

Prior to the addition of the flexible tail or cable through the bent end of the shank it was found that at the high speed operation which this type of feed-through machine is capable of, damage resulted to the threads of the nut. It may be mentioned that this machine is capable of producing over 600 nuts a minute and the operation of the tap may exceed 6,000 r.p.m.

For reasons which are not fully understood, it has been found that at these high speeds, changes in design of the rigid, bent shank of the tap were not able to eliminate the thread damage. However, the addition of the flexible tail or cable as disclosed herein has the effect of substantially completely eliminating thread damage and permits the machine to be operated at its maximum capacity for long periods of time.

The drawings and the foregoing specification constitute a description of the improved tap having a flexible shank portion in such full, clear, concise and exact terms as to enable any person skilled in the art to practice the invention, the scope of which is indicated by the appended claims.

What I claim as my invention is:

1. A tap for use on a feed-through machine, said tap having a head and a substantially rigid reversely bent shank portion and provided with a flexible elongated tail at the end of the shank opposite the tapping head, the flexible elongated tail having a diameter less than the minimum or root diameter of said head.

2. A tap as defined in claim 1 in which the flexible tail is formed of twisted or braided metallic filaments.

3. A tap as defined in claim 2 in which the flexible tail is of the type generally known as flexible aircraft cable.

4. A tap as defined in claim 1 in which the shank has a straight portion followed by a laterally curved portion which is followed in turn by a reversely curved portion having an angle of curvature between 30 and 90 degrees.

5. A tap as defined in claim 1 in which the length of the flexible tail is between 4 and 10 inches.

6. A tap as defined in claim 2 in which the shank has a straight portion followed by a laterally curved portion which is followed in turn by a reversely curved portion having an angle of curvature between 30 and 90 degrees.

7. A tap as defined in claim 2 in which the radius of curvature of the curved portions of the shank is between 2 and 3 inches.

8. A tap as defined in claim 2 in which the length of the flexible tail is between 4 and 10 inches.

9. A feed-through tapping machine comprising a rotating housing having a passageway extending therethrough and including a straight portion containing the axis of said housing and a laterally curved portion and dimensioned to receive a series of nuts and to prevent rotation of the nuts in the passageway as they are advanced therethrough, means for rotating the housing, a tap including a tapping head and a substantially rigid shank including a laterally curved driving portion received in the passageway in said rotating housing, and a flexible tail on the end of said shank remote from said head located at least partially within said housing and adapted to receive nuts advanced over the shank through the passage in the housing, said tail having a diameter less than the minimum or root diameter of said head.

References Cited

UNITED STATES PATENTS

| 861,221 | 7/1907 | McKenzie | 10—141 |
| 999,090 | 7/1911 | Bray | 10—141 |
| 2,137,340 | 11/1938 | Hebor | 10—141 |

RICHARD J. HERBST, Primary Examiner

LOWELL A. LARSON, Assistant Examiner